United States Patent
Yuan et al.

(10) Patent No.: US 10,735,930 B2
(45) Date of Patent: Aug. 4, 2020

(54) METHOD AND APPARATUS FOR SHARING APPLICATION

(71) Applicant: SAMSUNG ELECTRONICS CO., LTD., Suwon-si (KR)

(72) Inventors: Jianguo Yuan, Nanjing (CN); Ming Liu, Nanjing (CN); Quan Ma, Nanjing (CN); Zhen Chen, Nanjing (CN)

(73) Assignee: SAMSUNG ELECTRONICS CO., LTD., Suwon-si, (KR)

( * ) Notice: Subject to any disclaimer, the term of this patent is extended or adjusted under 35 U.S.C. 154(b) by 147 days.

(21) Appl. No.: 15/075,749

(22) Filed: Mar. 21, 2016

(65) Prior Publication Data

US 2016/0360339 A1   Dec. 8, 2016

(30) Foreign Application Priority Data

Jun. 8, 2015   (CN) .......................... 2015 1 0307550
Nov. 30, 2015  (KR) ........................ 10-2015-0169271

(51) Int. Cl.
*H04W 4/60* (2018.01)
*H04W 8/00* (2009.01)
(Continued)

(52) U.S. Cl.
CPC .............. *H04W 4/60* (2018.02); *H04L 47/27* (2013.01); *H04L 67/104* (2013.01);
(Continued)

(58) Field of Classification Search
CPC . H04L 67/1095; H04L 67/104; H04L 47/125; H04L 67/42; H04L 67/08;
(Continued)

(56) References Cited

U.S. PATENT DOCUMENTS 5,758,110 A      5/1998  Boss et al.
8,910,057 B2 *  12/2014  Hornback, Jr. ....... G06F 3/1454
                                                        715/753
(Continued)

FOREIGN PATENT DOCUMENTS

CN      102331946 A      1/2012
CN      102510392 A      6/2012
(Continued)

OTHER PUBLICATIONS

Communication dated Jun. 16, 2016 issued by the International Searching Authority in counterpart International Application No. PCT/KR2016/002278 (PCT/ISA/210 & PCT/ISA/237).
(Continued)

*Primary Examiner* — Tonia L Dollinger
*Assistant Examiner* — Linh T. Nguyen
(74) *Attorney, Agent, or Firm* — Sughrue Mion, PLLC

(57) ABSTRACT

A method and an apparatus for sharing an application are provided. The method includes determining whether a target device is located in a communication range of a source device, and in response to the determining that the target device is located in the communication range of the source device, establishing a wireless connection to the target device. The method further includes transmitting, to the target device, a list of shareable applications providable by the source device, receiving, from the target device, a request to access an application among the shareable applications, executing the application, generating a window instance of the executed application for the target device, and transmitting the window instance to the target device.

15 Claims, 11 Drawing Sheets

(51) Int. Cl.
  *H04L 12/807* (2013.01)
  *H04L 29/08* (2006.01)
  *H04W 4/80* (2018.01)
  *H04W 4/08* (2009.01)
  *H04W 76/14* (2018.01)

(52) U.S. Cl.
  CPC ............ *H04L 67/125* (2013.01); *H04L 67/16* (2013.01); *H04W 4/08* (2013.01); *H04W 4/80* (2018.02); *H04W 8/005* (2013.01); *H04W 76/14* (2018.02)

(58) Field of Classification Search
  CPC ......... H04L 67/10; H04L 51/10; H04L 51/32; H04L 67/125; H04L 67/16; H04L 67/20; H04L 67/36; H04L 69/329; H04L 67/148; H04L 65/1083; H04L 65/403; H04L 12/1813; G06F 8/30; G06F 3/0481; G06F 3/1454; G06F 2209/545; G06F 3/01; G06F 3/041; G06F 3/0488; G06F 3/14; G06F 9/451; G06F 9/54; G06F 3/048; G06F 3/0484; G06F 9/453; G06F 21/606; G06F 11/3636; G06F 16/955; G06F 3/0647; G06F 11/2023; G06F 17/30041; G06F 3/011; G06F 3/04842; G06F 3/0482; G06F 21/84; G06F 13/385; H04W 88/04; H04W 8/205; H04W 92/18
  USPC ........ 703/202, 203, 219, 225; 717/103, 167; 709/203, 219; 345/173, 1.1, 2.1, 2.2
  See application file for complete search history.

(56) References Cited

U.S. PATENT DOCUMENTS

| | | | |
|---|---|---|---|
| 8,965,349 B2 | 2/2015 | Kieft et al. | |
| 9,507,997 B2* | 11/2016 | Mor et al. | .............. G06L 7/10 |
| 9,673,996 B1* | 6/2017 | Upadhyay | ............. H04L 12/803 |
| 2007/0149116 A1 | 6/2007 | White et al. | |
| 2010/0099359 A1* | 4/2010 | Lee | .................. H04L 65/80 455/41.3 |
| 2011/0072304 A1 | 3/2011 | Watanabe | |
| 2011/0161980 A1* | 6/2011 | English | ................ G06F 9/5083 718/105 |
| 2012/0092277 A1* | 4/2012 | Momchilov | ............ G06F 3/038 345/173 |
| 2012/0284757 A1* | 11/2012 | Rajapakse | ........ H04N 21/41407 725/81 |
| 2012/0324365 A1* | 12/2012 | Momchilov | ............. G06F 3/14 715/738 |
| 2013/0238702 A1 | 9/2013 | Sheth et al. | |
| 2013/0282564 A1* | 10/2013 | Sibbald | .................. H04L 29/08 709/217 |
| 2013/0326502 A1* | 12/2013 | Brunsman | ................. G06F 8/61 717/178 |
| 2013/0346919 A1 | 12/2013 | Adderton | |
| 2014/0073253 A1* | 3/2014 | Lazaridis | ............ H04W 76/022 455/41.2 |
| 2014/0115176 A1 | 4/2014 | Kamboh et al. | |
| 2014/0170978 A1 | 6/2014 | Wolman et al. | |
| 2014/0215457 A1* | 7/2014 | Gava et al. | ............. H04L 29/08 717/178 |
| 2014/0317242 A1* | 10/2014 | Koo | .................... H04L 67/1097 709/219 |
| 2015/0032887 A1* | 1/2015 | Pesek et al. | ............ H04L 12/26 709/224 |
| 2015/0113432 A1* | 4/2015 | Jung | ...................... H04L 67/10 715/748 |
| 2015/0120817 A1 | 4/2015 | Jeong et al. | |
| 2015/0140540 A1* | 5/2015 | Kobayashi | ............... G09B 5/21 709/208 |
| 2015/0143253 A1* | 5/2015 | Kamiyama | ........... G06F 3/0482 715/745 |
| 2015/0200975 A1* | 7/2015 | Perez et al. | ............. H04L 29/06 709/204 |
| 2015/0222699 A1* | 8/2015 | Quinn | .................... H04L 49/08 709/203 |
| 2015/0326655 A1* | 11/2015 | Quan | .................... H04L 67/104 709/201 |
| 2015/0334139 A1* | 11/2015 | Conklin | ................ G06F 3/1423 715/753 |
| 2016/0006800 A1* | 1/2016 | Summers | .............. G06F 9/5055 709/203 |
| 2016/0077710 A1* | 3/2016 | Lewis | ................. G06F 3/04842 715/716 |
| 2016/0149969 A1* | 5/2016 | Farmer | ................ G06Q 10/101 709/204 |
| 2016/0191621 A1* | 6/2016 | Oh | .......................... H04L 29/08 709/205 |

FOREIGN PATENT DOCUMENTS

| | | |
|---|---|---|
| CN | 103186375 A | 7/2013 |
| CN | 103761472 A | 4/2014 |
| CN | 104156258 A | 11/2014 |
| CN | 104238879 A | 12/2014 |
| CN | 104317496 A | 1/2015 |
| CN | 104601205 A | 5/2015 |
| EP | 2 843 919 A1 | 3/2015 |

OTHER PUBLICATIONS

Communication dated Feb. 12, 2019, issued by the Chinese Patent Office in counterpart Chinese Application No. 201510307550.2.
Communication dated Aug. 11, 2017, issued by the State Intellectual Property Office of P.R. China in counterpart Chinese Application No. 201510307550.2.
Communication dated May 3, 2018, issued by the European Patent Office in counterpart European Application No. 16807661.0.
Communication dated Mar. 21, 2018, issued by the State Intellectual Property Office of P.R. China in counterpart Chinese Application No. 201510307550.2.

* cited by examiner

METHOD AND APPARATUS FOR SHARING APPLICATION

CROSS-REFERENCE TO RELATED APPLICATIONS

This application claims priority from Chinese Patent Application No. 201510307550.2, filed on Jun. 8, 2015, in the Chinese Patent Office, and Korean Patent Application No. 10-2015-0169271, filed Nov. 30, 2015, in the Korean Intellectual Property Office, the disclosures of which are incorporated herein by reference in their entireties.

BACKGROUND

1. Field

Methods and apparatuses consistent with exemplary embodiments relate to a method and apparatus for sharing an application.

2. Description of the Related Art

Currently, smart phones and tablets are increasingly used. People install various applications to satisfy requirements of daily life, entertainment, learning, and work. However, operating system (OS) platforms of different smart phones provide applications having different formats that are incompatible with each other.

Users download applications from application stores, the Internet, etc., and then install the applications on smart phones. The applications installed in smart phones of users are periodically updated. The same applications are installed in a plurality of smart phones and perform the same functions.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide a method and an apparatus in which a target device shares an application.

According to an aspect of an exemplary embodiment, there is provided a method of sharing an application, the method including determining whether a target device is located in a communication range of a source device, and in response to the determining that the target device is located in the communication range of the source device, establishing a wireless connection to the target device. The method further includes transmitting, to the target device, a list of shareable applications providable by the source device, receiving, from the target device, a request to access an application among the shareable applications, executing the application, generating a window instance of the executed application for the target device, and transmitting the window instance to the target device.

The receiving may include receiving, from the target device, a name of the application that is selected by a user from the list of the shareable applications.

The method may further include, in response to the receiving the request to access the application, determining whether the application is executed on the source device. The generating may include, in response to the determining that the application is executed on the source device, generating the window instance of the executed application for the target device, and the executing may include, in response to the determining that the application is not executed on the source device, executing the application.

The method may further include determining whether the target device leaves the communication range of the source device, and in response to the determining that the target device leaves the communication range of the source device, ending the wireless connection to the target device.

The method may further include, in response to the determining that the target device leaves the communication range of the source device, searching for another source device able to communicate with the target device, and transmitting, to the other source device, information of the application and execution information of the application.

The method may further include determining whether the target device is attempting to access the application for more than an access time, and ending the wireless connection to the target device in response to the determining that the target device is accessing the application for more than the access time.

The method may further include determining whether the target device does not perform an operation of the application for more than an operation standby time, and ending the wireless connection to the target device in response to the determining that the target device does not perform the operation of the application for more than the operation standby time.

The source device may be located in a source device cluster, and a cluster manager of the source device cluster may receive a wireless connection request from the target device, and in response to the receiving the wireless connection request, select the source device from the source device cluster based on a load-balancing algorithm. The method may further include receiving, from the cluster manager, a notification to establish the wireless connection to the target device.

A non-transitory computer readable storing medium may store a program to cause a computer to perform the method.

According to an aspect of another exemplary embodiment, there is provided an apparatus for sharing an application, the apparatus including a processor configured to determine whether a target device is located in a communication range of the source device, and a communicator configured to, in response to the processor determining that the target device is located in the communication range of the source device, establish a wireless connection to the target device. The processor may be further configured to control the communicator to transmit, to the target device, a list of shareable applications providable by the source device, receive, from the target device via the communicator, a request to access an application among the shareable applications, execute the application, generate a window instance of the executed application for the target device, and control the communicator to transmit the window instance to the target device.

The processor may be further configured to receive, from the target device via the communicator, a name of the application that is selected by a user from the list of the shareable applications.

The processor may be further configured to, in response to the processor receiving the request to access the application, determine whether the application is executed on the source device, in response to the processor determining that the application is executed on the source device, generate the window instance of the executed application for the target device; and in response to the processor determining that the application is not executed on the source device, execute the application.

The processor may be further configured to determine whether the target device leaves the communication range of the source device, and in response to the processor determining that the target device leaves the communication range of the source device, end the wireless connection to the target device.

The processor may be further configured to, in response to the processor determining that the target device leaves the communication range of the source device, search for another source device able to communicate with the target device, and control the communicator to transmit, to the other source device, information of the application and execution information of the application.

The processor may be further configured to determine whether the target device is attempting to access the application for more than an access time, and end the wireless connection to the target device in response to the processor determining that the target device is accessing the application for more than the access time.

The processor may be further configured to determine whether the target device does not perform an operation of the application for more than an operation standby time, and end the wireless connection to the target device in response to the processor determining that the target device does not perform the operation of the application for more than the operation standby time.

The processor may be further configured to receive, from the target device via the communicator, information that is input to the window instance on the target device, and process the information.

The source device may be located in a source device cluster, a cluster manager of the source device cluster may receive a wireless connection request from the target device, and in response to the receiving the wireless connection request, select the source device from the source device cluster based on a load-balancing algorithm, and the communicator may be further configured to receive, from the cluster manager, a notification to establish the wireless connection to the target device.

According to an aspect of another exemplary embodiment, there is provided an apparatus for sharing an application, the apparatus including a communicator configured to establish a wireless connection to a source device, a display, and a processor configured to control the communicator to transmit, to the source device, a request to access an application, receive, from the source device via the communicator, a window instance that is generated during execution of the application, and control the display to display the window instance.

The processor may be further configured to receive, via the display, information that is input to the displayed window instance, and control the communicator to transmit the information to the source device.

According to an aspect of another exemplary embodiment, there is provided a method of sharing an application, the method including receiving, from a target mobile device, a request to access an application of a source mobile device, and determining whether a number of target mobile devices accessing the application is less than a threshold. The method further includes, in response to the determining that the number of target mobile devices accessing the application is less than the threshold, establishing a wireless connection to the target mobile device, and generating a window instance of the application for the target mobile device, and transmitting the window instance to the target mobile device.

The method may further include receiving, from the target mobile device, information that is input to the window instance that is displayed on the target mobile device, processing the information to generate another window instance of the executed application for the target mobile device, and transmitting the other window instance to the target mobile device.

The method may further include, in response to the determining that the number of target mobile devices accessing the application is greater than or equal to the threshold, adding an identifier of the target mobile device to a waiting queue of target mobile devices.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
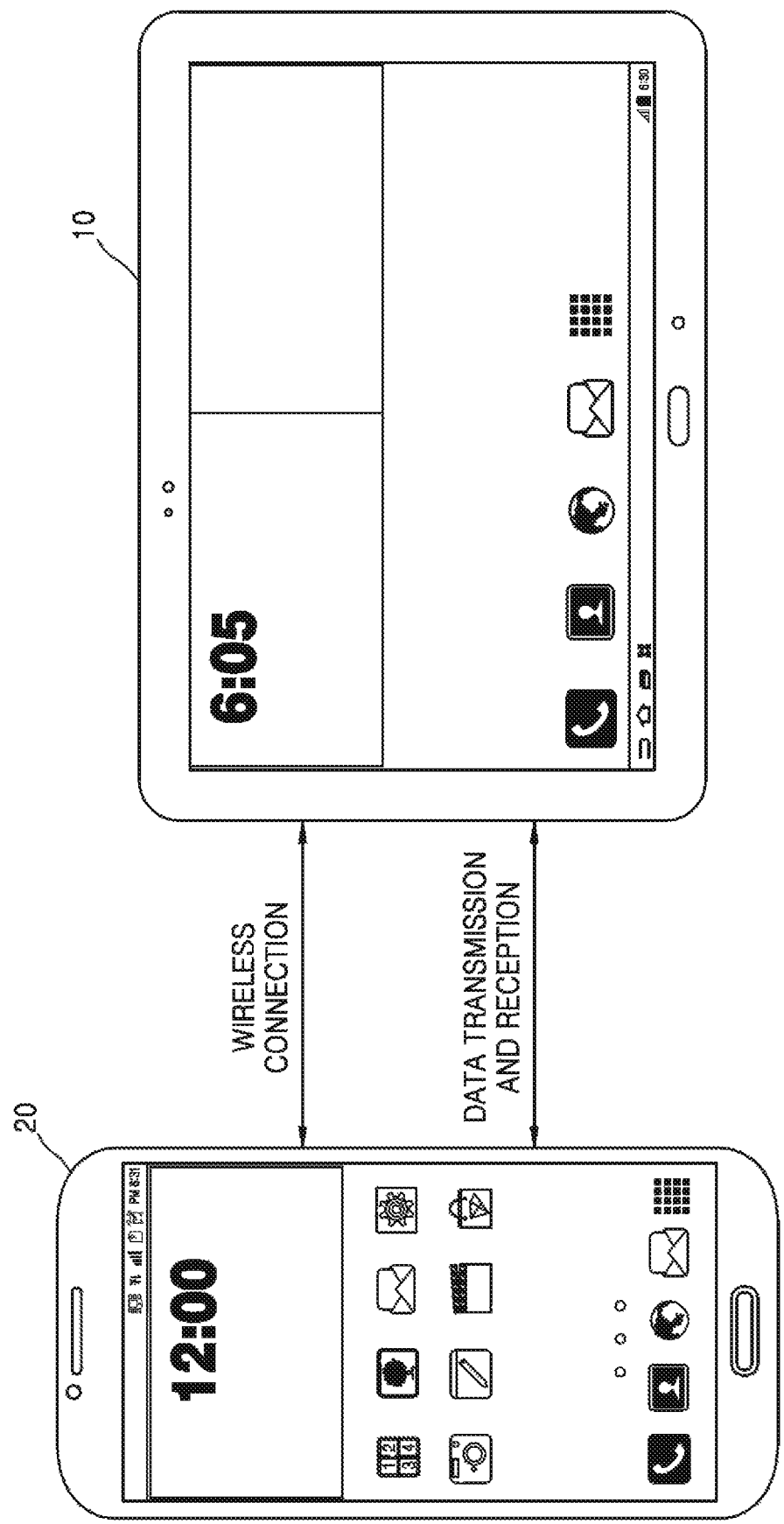
FIG. 1 is a diagram illustrating sharing an application between a target device and a source device, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit," "-er (-or)," and "module" described in the specification refer to an element for performing at least one function or operation, and may be implemented in hardware, software, or the combination of hardware and software.

FIG. 1 is a diagram illustrating sharing an application between a target device 20 and a source device 10, according to an exemplary embodiment. Referring to FIG. 1, the target device 20 and the source device 10 may share the same application. The target device 20 may use an application installed in the source device 10 but may not install the application itself.

The source device 10 may determine whether the target device 20 is located in a communication available region. The source device 10 may designate the communication available region in consideration of a distance from the source device 10. Alternatively, the target device 20 may determine whether the source device 10 is located in the communication available region.

The target device 20 and the source device 10 establish a wireless connection. The target device 20 may request the wireless connection from the source device 10. For example, the target device 20 may transmit a connection request packet to the source device 10. The connection request packet may include information of the target device 20, a name of the target device 20, an identifier of the target device 20, etc. Alternatively, the source device 10 may request the wireless connection from the target device 20.

When the wireless connection is established between the target device 20 and the source device 10, the target device 20 and the source device 10 transmit and receive data. The data may be transmitted by the target device 20 to the source device 10 or, may be transmitted by the source device 10 to the target device 20. The source device 10 may transmit a list of applications provided from the source device 10 to the target device 20. The target device 20 may designate an application that is to be used from the list of applications and may transmit data indicating the designated application to the source device 10. The source device 10 may execute the application and may transmit a screen of the application to the target device 20. The target device 20 may receive the screen of the application, may receive a user input, and may transmit the user input to the source device 10.

According to the above operations, the target device 20 may use an application installed in the source device 10 without having to install the application.

Figure 2:
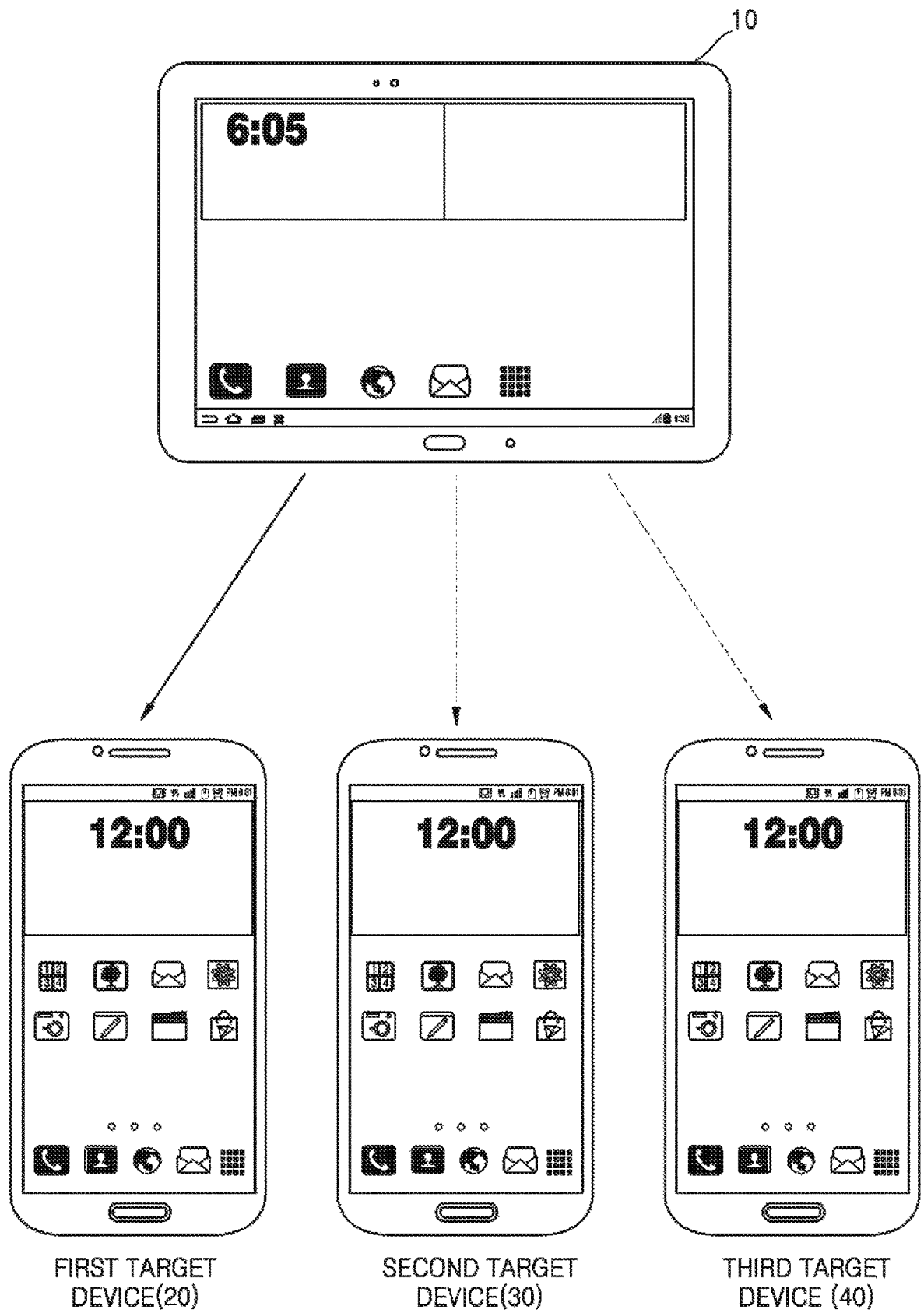
FIG. 2 is a diagram illustrating sharing an application installed in a source device between a plurality of target devices, according to an exemplary embodiment.

FIG. 2 is a diagram illustrating sharing an application installed in the source device 10 between a plurality of target devices 20 through 40, according to an exemplary embodiment.

The plurality of target devices 20 through 40 may access the application installed in the source device 10. The plurality of target devices 20 through 40 may independently use a sharing application. The sharing application may be the application installed in the source device 10 or may be an application available from a device other than the source device 10.

Each of the plurality of target devices 20 through 40 may establish a connection with the source device 10. The source device 10 may be wirelessly connected to all of the plurality of target devices 20 through 40 and may be connected to only a first target device 20. The source device 10 may determine whether the plurality of target devices 20 through 40 are authorized to use the application and may establish the connection with only an authorized target device.

The source device 100 may create a separate window for the plurality of target devices 20 through 40. Because the source device 10 provides different images to the plurality of target devices 20 through 40, the source device 10 may create a separate image for each of the plurality of target devices 20 through 40, and may transmit the separate image to each of the plurality of target devices 20 through 40.

Figure 3:
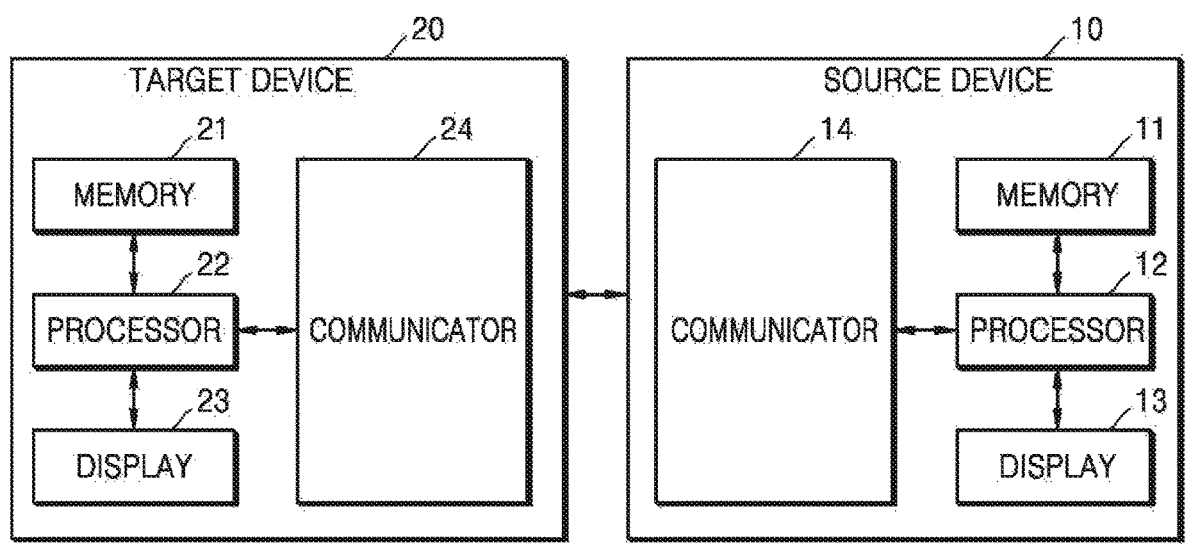
FIG. 3 is a block diagram of a source device and a target device, according to an exemplary embodiment.

FIG. 3 is a block diagram of the source device 10 and the target device 20, according to an exemplary embodiment.

The source device 10 includes a memory 11, a processor 12, a display 13, and a communicator 14. The memory 11 may store data. The memory 11 may store a list of the target devices 20 accessible to the source device 10. For example, the memory 11 may store identifiers of the target devices. The memory 11 may also store a window, an image, various types of data, etc. that are created by the processor 12.

The processor 12 may process the data. The processor 12 may process a request received from the communicator 14. The processor 12 may compare an identifier of the target device 20 and an identifier stored in the memory 11 to process a connection request of the target device. The processor 12 may create data that is to be transmitted to the target device 20. The processor 12 may store the data in the memory 11 or may read the data stored in the memory 11.

The processor 12 may control the display 13. The processor 12 may create an image, a moving image, etc. to be reproduced by the display 13, and output the image, the moving image, etc. to the display 13.

The display 13 may reproduce the image or the moving image received from the processor 12. When the source device 10 does not need to the reproduce the image, the source device 10 may not include the display 13.

The communicator 14 may receive the data from the target device 14 or may transmit the data to the target device 14. The communicator 14 of the source device 10 may establish a wireless connection with a communicator 24 of the target device 20.

The target device 20 includes a memory 21, a processor 22, a display 23, and the communicator 24.

The memory 21 may store data. The memory 21 may store data processed by the processor 22 and may store data regarding the source device 10.

The processor 22 may process the data. The processor 22 may process a request received from the communicator 24. The processor 22 may transmit an identifier of the target device 20 to the source device 10 through the communicator 24 for a connection with the source device 10. The processor 22 may create data that is to be transmitted to the source device 10. The processor 22 may store the data in the memory 21 or may read the data stored in the memory 21.

The processor 22 may control the display 23. The processor 22 may create an image, a moving image, etc. that are to be reproduced by the display 23, and output the image, the moving image, etc. to the display 23.

The display 23 may reproduce the image or the moving image received from the processor 22. The display 23 may reproduce a window, an image, a moving image, etc. that are received from the source device 10.

The display 23 may receive a user input. The display 23 may include a touch panel that may recognize pressure or current. The display 23 may use the touch panel to receive the user input and output the user input to the processor 22. The user input may be transmitted to the source device 10 through the communicator 24.

Figure 4:
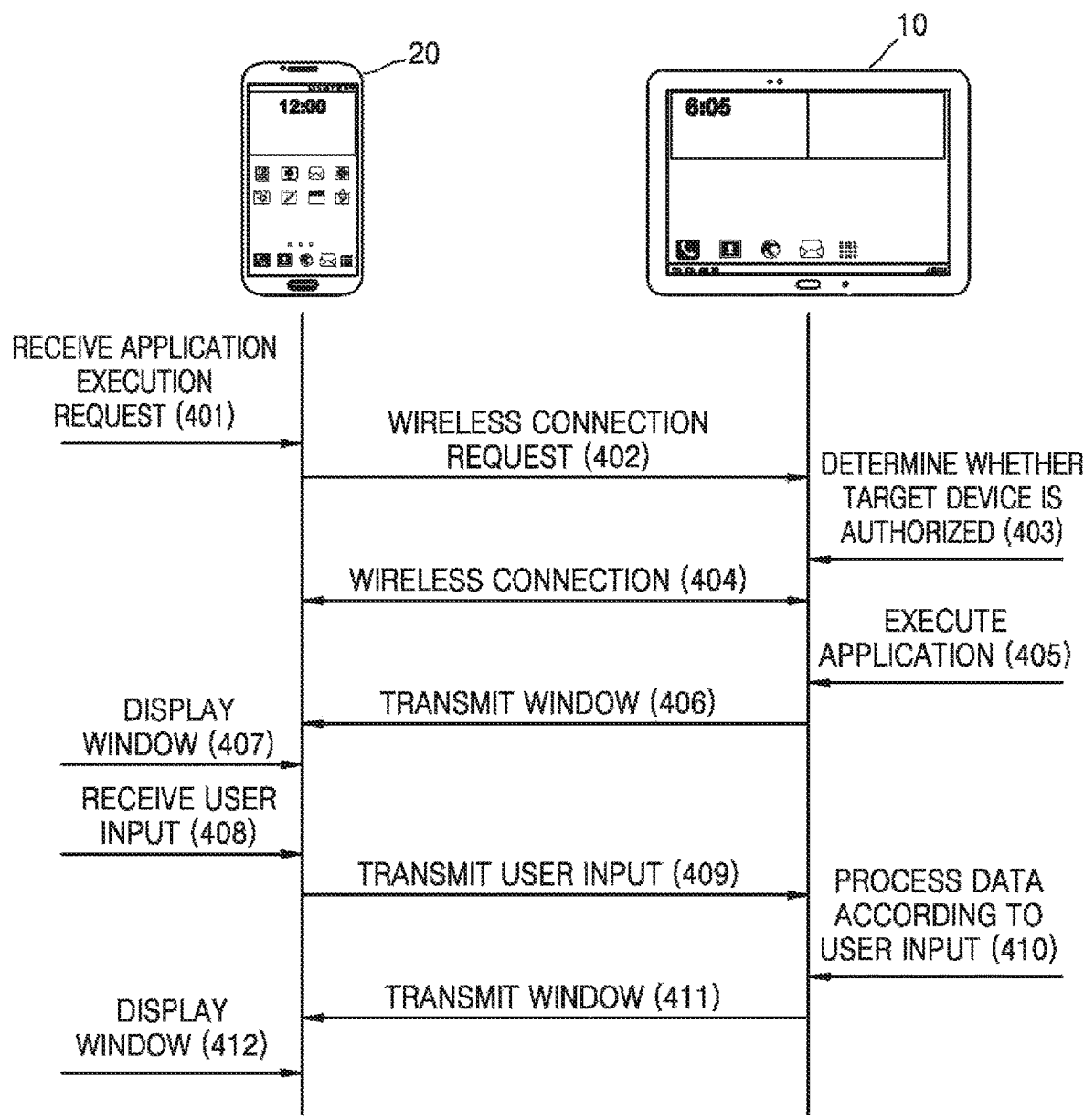
FIG. 4 is a flowchart of a method of sharing an application, according to an exemplary embodiment.

FIG. 4 is a flowchart of a method of sharing an application, according to an exemplary embodiment. Referring to FIG. 4, the target device 20 may execute the application through the source device 10.

In operation 401, the target device 20 receives a request to execute the application from a user. The user may touch a screen of the target device 20 to input the request to execute the application.

In operation 402, when the source device 10 is located in a communication available region, the target device 20 requests a wireless connection from the source device 10. The target device 20 may transmit a packet including a message to request a connection to execute the application and an identifier of the target device 20 to the source device 10.

In operation 403, the source device 10 determines whether the target device 20 is authorized to use the application. The source device 10 may compare the identifier of the target device 20 and an identifier stored in the memory 11 to determine whether target device 20 is authorized to use the application. When the target device 20 is authorized to use the application, operation 404 is performed. If not, a procedure ends.

In operation 404, the target device 20 and the source device 10 establish the wireless connection. The target device 20 and the source device 10 may be in a state in which data may be transmitted and received. The source device 10 may transmit a list of applications provided from the source device 10 to the target device 20 and may receive an application providing request from the target device 20. The target device 20 may transmit information indicating an application selected from the user from the list of applications to the source device 10.

In operation 405, the source device 10 executes the application. The source device 10 may create a window of the application, an image, a moving image, etc.

In operation 406, the source device 10 transmits the window, the image, the moving image, etc. to the target device 20.

In operation 407, the target device 20 displays the window, the image, the moving image, etc. received from the source device 10 on the display 23.

In operation 408, the target device 2 receives a user input. A user may input data through a touch input, a keyboard input, etc.

In operation 409, the target device 20 transmits the user input to the source device 10.

In operation 410, the source device 10 processes the data according to the user input. The source device 10 may output an application execution result with respect to the user input. For example, the source device 10 may create a window according to the user input. The source device 10 may also create the data according to the user input.

In operation 411, the source device 10 transmits the window, the image, or the moving image to the target device 20. The window transmitted to the target device 20 may show a processing result with respect to the user input.

In operation 412, the target device 20 displays the window, the image, or the moving image from the source device 10.

Figure 5:
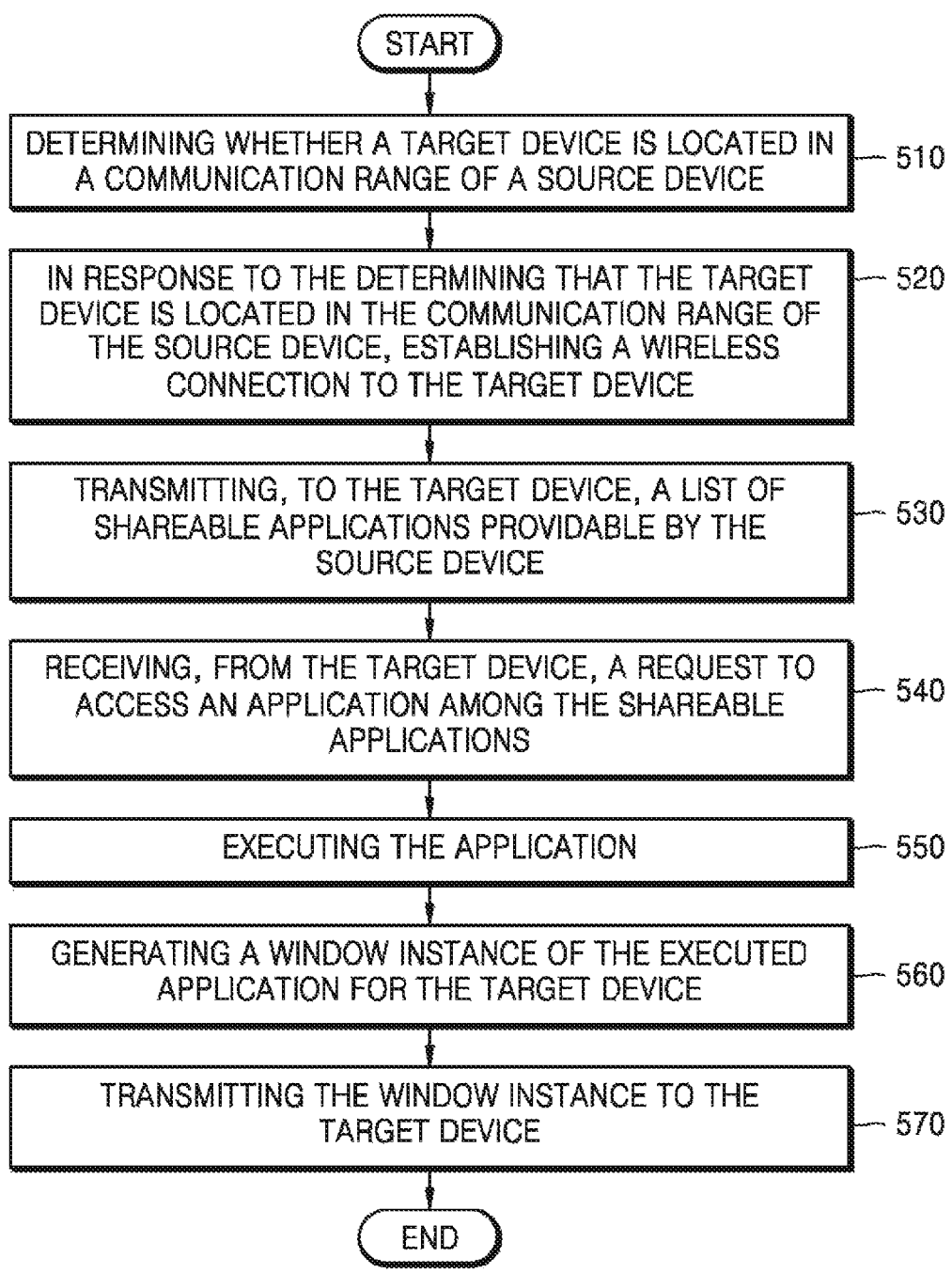
FIG. 5 is a flowchart of a method of sharing an application, according to another exemplary embodiment.

FIG. 5 is a flowchart of a method of sharing an application, according to another exemplary embodiment.

In operation 510, the source device 10 determines whether the target device 20 is located in a communication available region.

In operation 520, when the target device 20 is located in a communication available region, the source device 10 establishes a wireless connection with the target device 20. A sharing application may mean an application shared by the source device 10 and the target device 20. For example, the wireless connection may mean a wireless local area network (WLAN) connection, a Wi-Fi connection, etc.

In operation 530, the source device 10 transmits a name list of shareable applications provided from the source device 10 to the target device 20 and starts or executes a sharing application requested by the target device 20. The target device 20 may receive an input of selecting one from the plurality of sharing application from a user and may transmit the user input to the source device 10. The target device 20 may start the sharing application according to the user input. In this regard, the sharing application may not be installed in the target device 20. The source device 10 may receive a sharing application access request carrying a name of the sharing application.

In operation 540, the source device 10 creates a window instance of the sharing application for the target device 20.

In operation 550, the source device 10 transmits windows created during the execution of the sharing application to the target device 20.

After receiving the sharing application access request from the target device 20, before starting the sharing application, the source device 10 may determine whether the sharing application is operating in the source device 10. If the sharing application is operating in the source device 10, the source device 10 may immediately create the window instance of the sharing application for the target device 20. If not, the source device 10 may start the sharing application.

After receiving the sharing application access request from the target device 20, before creating the window instance of the sharing application for the target device 20, the source device 10 may determine whether the number of the target devices 20 accessing the sharing application is less than an appropriate number of the target devices 20 accessing the sharing application. If the number of the target devices 20 accessing the sharing application is less than the appropriate number of the target devices 20 accessing the sharing application, the source device 10 may create the window instance of the sharing application for the target device 20. If not, identifiers of the target devices 20 may be sequentially added to a waiting queue of the sharing application. When the other target device 20 ends the sharing application, an identifier of the first target device 20, which is stored in the waiting queue first of all, may be extracted from the waiting queue, and the source device 10 may create the window instance of the sharing application for the target device 20 corresponding to the extracted identifier of the first target device 20.

Operation 550 of transmitting the windows created during the execution of the sharing application to the target device 20 may be as follows. When the sharing application is to create a static window, the source device 10 may search for a static window list in a buffer for the static window according to coding of the static window. If the static window is found, the source device 10 may directly copy the static window in the buffer and may transmit the copied static window to the target device 20. If no static window is found, the source device 10 may create and copy a static window, may transmit the copied static window to the target device 20, and may store the copied static window to the static window list in the buffer.

Further, in operation 550, after transmitting the windows created during the execution of the sharing application to the target device 20, the source device 10 may receive information input in the window of the sharing application from the target device 20 and may process the information.

The source device 10 may be located in a source device cluster, and operation 520 of establishing the WLAN connection between the source device 10 and the target device 20 may be as follows.

A cluster manager of the source device cluster may receive a WLAN connection request from the target device 20, may select the source device 10 from the source device cluster according to a preconfigured load-balancing algorithm, and may notify the target device 20 of the selected source device 10 to establish the WLAN connection with the target device 20.

Operation 530 of receiving the sharing application access request from the target device 20 may be as follows. After establishing the WLAN connection with the target device 20, the source device 10 selected by the cluster manager may receive the sharing application access request from the target device 20.

In practical applications, for external devices, a WLAN address of the source device cluster may be an address of the cluster manager, and thus the target device 20 may firstly establish the WLAN connection with the cluster manager and then establish the WLAN connection with the source device 10 selected by the cluster manager.

The cluster manager may be a device independent of the source device cluster, or may be the source device 10 in the source device cluster.

Figure 6:
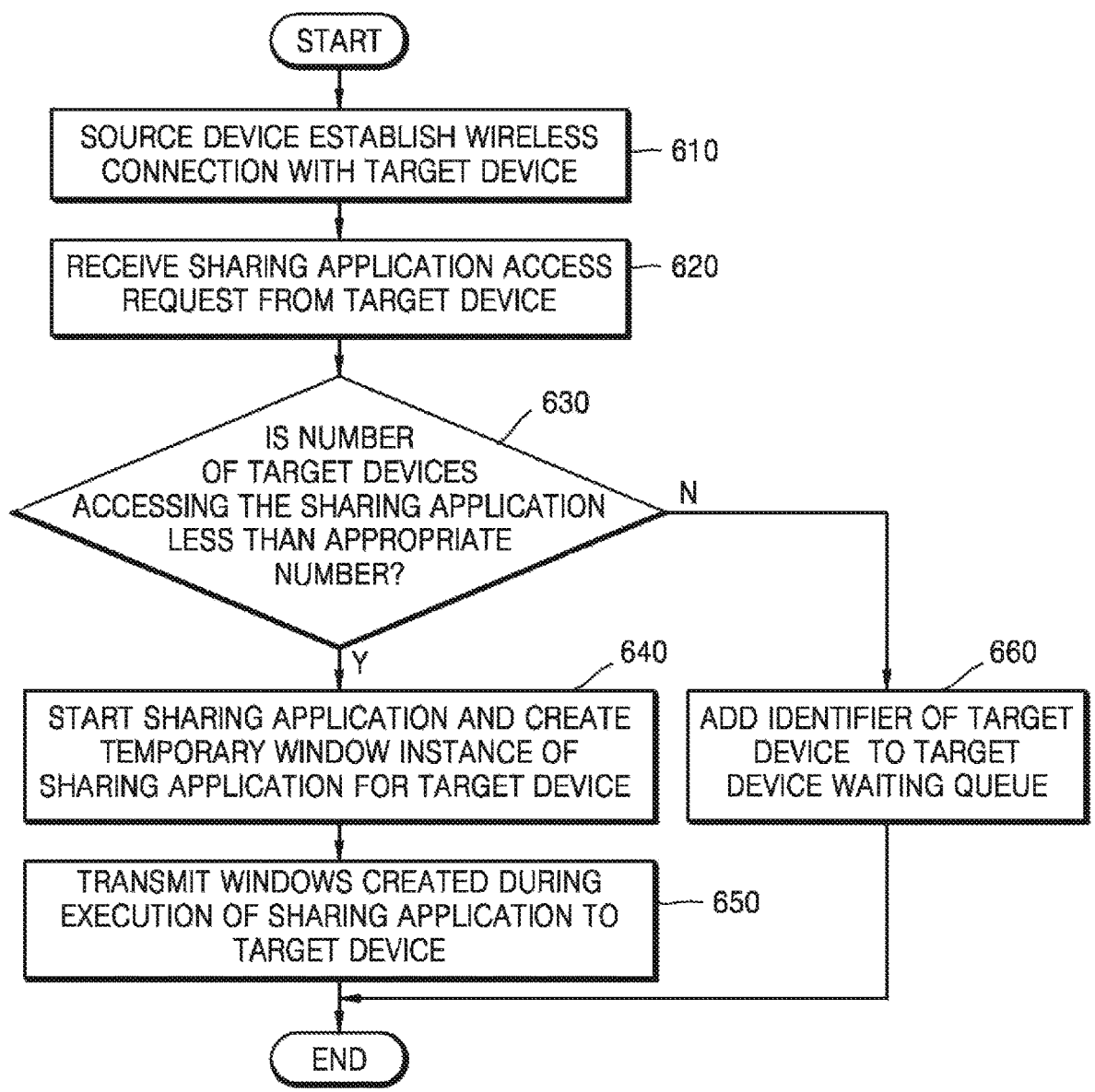
FIG. 6 is a flowchart of a method of sharing an application, according to another exemplary embodiment.

FIG. 6 is a flowchart of a method of sharing an application, according to another exemplary embodiment. The source device 10 may limit the number of the target devices 20 accessing a sharing application.

In operation 610, the source device 10 establishes a wireless (e.g., WLAN) connection with the target device 20 to use the sharing application. The sharing application may be installed on the source device 10.

For example, the target device 20 may transmit a sharing application access request and an identifier of the target device 20 to the source device 10. A user may open a WLAN of the target device 20 and may select an identifier of the source device 10 from a WLAN list. A WLAN interface of the target device 20 may detect that the identifier of the source device 10 is selected and then establish the WLAN connection with the source device 10.

The source device 10 may maintain a legal target device list recording identifiers of the target devices 20 allowed to access to the sharing application. After receiving a WLAN connection establishing request from the target device 20, the source device 10 may firstly determine whether the identifier of the target device 20 is included in the legal target device list. If the identifier of the target device 20 is included in the legal target device list, the source device 10 may establish the WLAN connection with the target device 20. If not, the source device 10 may refuse to establish the WLAN connection with the target device 20.

In an exemplary embodiment, after the WLAN connection between the target device 20 and the source device 10 is established, the source device 10 may transmit a sharing application name list to the target device 20. The target device 20 may display the sharing application name list on a screen. When detecting that the user selects an application name from the sharing application name list, the target device 20 may transmit the sharing application access request carrying a name of the sharing application and the identifier of the target device 20 to the source device 10.

In operation 620, the source device 10 receives the sharing application access request from the target device 20. In operation 630, the source device 10 determines whether the number of the target devices 20 accessing the sharing application is less than an appropriate number of the target devices 20 accessing the sharing application. If the number of the target devices 20 accessing the sharing application is less than the appropriate number of the target devices 20 accessing the application, operation 640 may be performed. If not, operation 660 may be performed. The source device 10 may install a plurality of shareable applications. The plurality of shareable applications may have different appropriate numbers of the target devices 20 that are accessible. The source device 10 may limit the number of the target devices 20 accessing the sharing application such that the sharing application normally operates.

In another exemplary embodiment, the source device 100 may determine whether the number of the target devices 20 accessing the source device 10 is less than an appropriate number of the target devices 20 accessing the source device 10. The source device 10 may limit the number of the target devices 20 accessing the source device 10.

In operation 640, the source device 10 starts the sharing application and creates a temporary window instance of the sharing application for the target device 20.

In operation 650, the source device 10 transmits static or dynamic windows created during execution of the sharing application to the target device 20.

In operation 660, the source device 10 adds the identifier of the target device 20 to a target device waiting queue of the application. When the other target device 20 ends the sharing application, the source device 10 may extract an identifier of the first target device 20 from the target device waiting queue of the application, and may allow the first target device 20 to access the sharing application.

In an exemplary embodiment, the source device 10 may firstly detect whether the application is executing. If the application is executing, the source device 10 may create the window instance of the application for the target device 20. If not, the source device 10 may start the application, and then create the window instance of the application for the target device 20.

For one application, when the source device 10 creates the window instance, the window instance may include all windows created after the application is executing.

When the application is running, the user may input information via the window displayed on the target device 20. After receiving the information input by the user, the target device 20 may transmit the information to the source device 10. The application executing on the source device 10 may process the information, and a processing result may be displayed on a following window that will be transmitted to the target device 20 in real time to show the processing result to the user.

The source device 10 may not display the windows transmitted to the target device 20 on the window of the source device 10.

After the application starts to execute on the source device 10, if the target device 20 requests to access the application, the source device 10 may create a new window instance of the application for the target device 20. In the new window instance, all the windows after the application starts executing may be sequentially created. The source device 10 may transmit all the windows created in the window instance to the target device 20 in real time. In other words, for the same application, the source device 10 may create different window instances for the target devices 20 accessing the application at different time so that one application executing on the source device 10 may be shared by multiple target devices 20, and different contents may be displayed on different target devices 20 because the window instances of the different target devices 20 are different.

When transmitting the static or dynamic window created during the execution of the application to the target device 20, the source device 10 may pack and code each frame of the static or dynamic window and may transmit the coded window to the target device 20 via a preconfigured stream media transmission protocol.

In an exemplary embodiment, when the source device 10 creates the static window for the sharing application, if the static window is created for the first time, the source device 10 may store the static window in the buffer. No static window may be created again for a following window instance of the sharing application, and the static window may be obtained from the buffer directly and transmitted to the target device 20.

In an exemplary embodiment, the source device 10 may limit a time taken for each target device 20 to access the sharing application. When the time taken for each target device 20 to access the sharing application is greater than an appropriate access time, the source device 10 may actively end the connection with the target device 20.

In an exemplary embodiment, when the source device 10 detects that the target device 20 accessing a sharing application does not perform any operation for the sharing application for an appropriate operation waiting or standby time, the source device 10 may actively disconnect the connection with the target device 20.

In an exemplary embodiment, the source device 10 may record detailed information of using the sharing application for the target device 20. The detailed information may include a normal state or an abnormal state of quitting the sharing application, to perform state recovery when the target device 20 accesses the application again.

In an exemplary embodiment, the source device 10 may maintain a target device blacklist to record identifiers of the target devices 20 that are not allowed to access. In operation 610, after receiving the WLAN connection establishing request from the target device 20, the source device 10 may firstly search for the target device blacklist for the identifier carried in the WLAN connection establishing request. If the identifier is found in the target device blacklist, the source device 10 may refuse to establish the WLAN connection.

Alternatively, the source device 10 may search for the legal target device list for the identifier carried in the WLAN connection establishing request. If the identifier is found in the legal target device list, the source device 10 may establish the WLAN connection.

In addition, in an exemplary embodiment, the source device 10 may support one target device only for the sharing application, i.e., a single instance mode (the appropriate number of the target devices 20 accessing the sharing application is 1 in operation 630), or may support multiple target devices 20 for the sharing application, i.e., multiple instance modes (the appropriate number of the target devices 20 accessing the sharing application is greater than 1 in operation 630).

Figure 7:
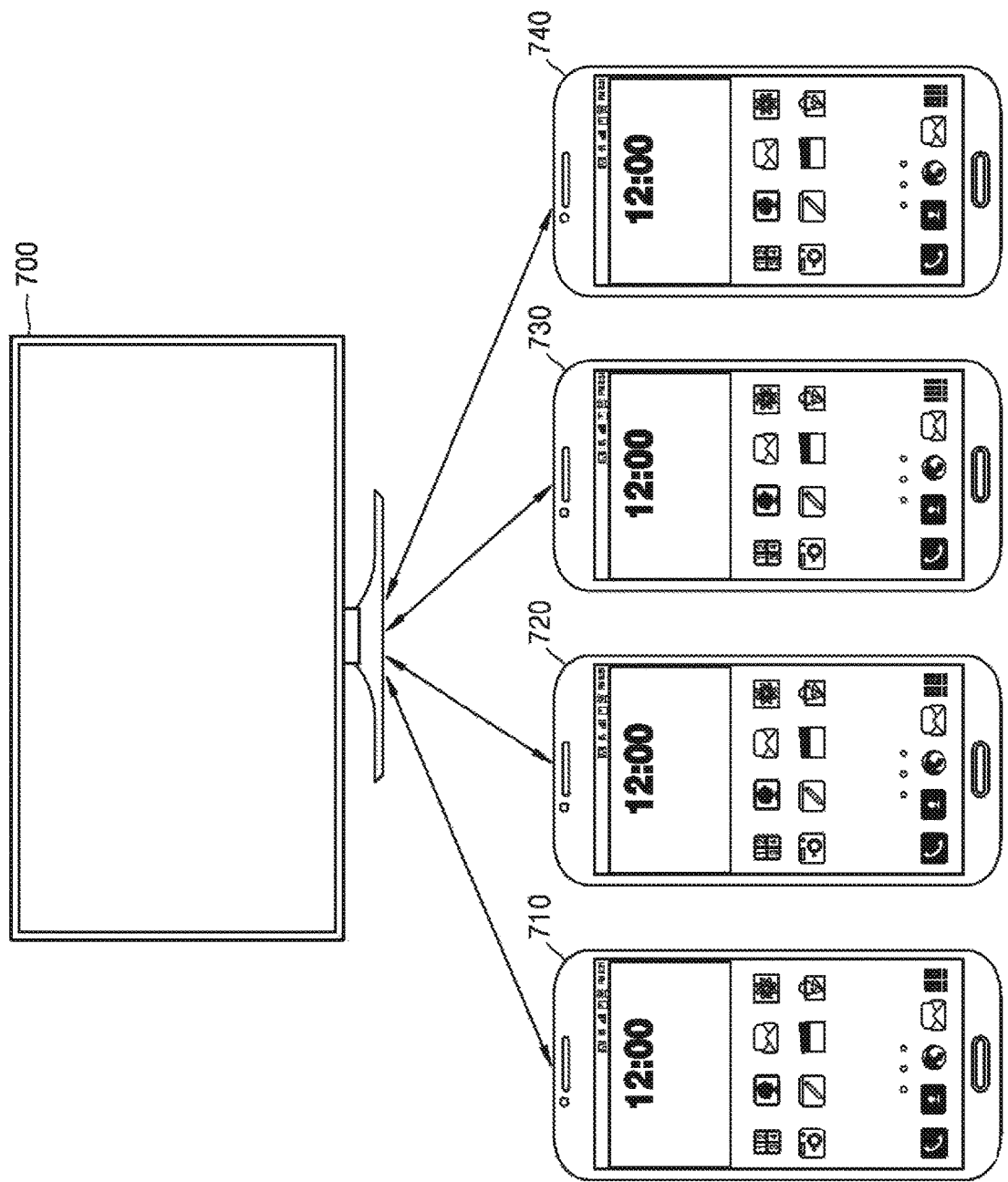
FIG. 7 is a diagram illustrating sharing an examination application, according to an exemplary embodiment.

FIG. 7 is a diagram illustrating sharing an examination application, according to an exemplary embodiment. A TV 700 may be a source device executing the examination application. Mobile devices 710 through 740 may be target devices. The mobile devices 710 through 740 may be used by students. The examination application may be an application shared by the mobile devices 710 through 740.

The examination application may be executed through the TV 700 publicly available in a classroom. The students may access the TV 700 by using the mobile devices 710 through 740 of the students.

The students may open a WLAN on the mobile devices 710 through 740 and may select the TV 700 from a WLAN list so that the mobile devices 710 through 740 of the students establish a WLAN connection with the TV 700. The TV 700 may transmit a name of the examination application to the mobile devices 710 through 740. The mobile devices 710 through 740 may display the name of the examination application on a screen.

The students may select the name of the examination application via the mobile devices 710 through 740. The mobile devices 710 through 740 may transmit an examination application access request carrying the name of the examination application to the TV 700.

The TV 700 may receive the examination application access request from the mobile devices 710 through 740 and may create window instances for the mobile devices 710 through 740. Windows created after execution of the examination application may be sequentially included in the window instance. The windows may be transmitted to the mobile devices 710 through 740 in real time. The TV 700 may create the window instance with respect to each of the mobile devices 710 through 740. Thus, the window transmitted to each of the mobile devices 710 through 740 may be different according to time when the mobile devices 710 through 740 access the examination application or students.

After receiving the examination application access request, the TV 700 may firstly execute the examination application if the examination application is not executed.

If the students input answers in windows displayed on the mobile devices 710 through 740, the mobile devices 710 through 740 may transmit the answers to the TV 700. Each of the students may execute the examination application. The students may be independent from each other and may not influence each other.

In another exemplary embodiment, a market application may be shared by mobile devices of buyers.

A buyer may enter a market, open a WLAN via a mobile device of the buyer, and select a source device provided by the market from a WLAN list so that the mobile device of the buyer establishes a WLAN connection with the source device. The source device may transmit a name list of applications shared with the buyer to the mobile device of the buyer.

The buyer may select the market application via the mobile device. The mobile device may transmit a market application access request carrying a name of the market application to the source device. The source device may create a window instance of the market application for the mobile device. Windows created after execution of the market application may be sequentially included in the window instance. The source device may transmit the windows to the mobile device in real time. Thus, the buyer may scan latest commodity information and promotion information and may buy something via the application.

In another exemplary embodiment, the application may be shared by mobile devices of audiences.

An audience may enter a theater to watch a movie. Each TV 700 (i.e., the source device) hanging on the wall of a hall is playing a segment of a movie currently on release in the theater (different TVs 700 may play different movies).

If the audience wants to see a movie, the audience may open a WLAN via a mobile device and may select the TV 700 playing the segment of the movie from a WLAN list.

Hence, the mobile device of the audience may establish a WLAN connection with the selected TV 700. The TV 700 may transmit a name list of applications shared with the audience to the mobile device of the audience.

The audience may select a name of a seat-selecting application via the mobile device. The mobile device may transmit the name to the TV 700. The TV 700 may create a window instance of the seat-selecting application for the mobile device. Windows created after execution of the seat-selecting application may be sequentially included in the window instance. Every window may be transmitted to the mobile device by the TV 700 in real time.

The audience may select a seat via the window displayed on the mobile device. The mobile device may transmit a number of the seat selected by the audience to the TV 700. The TV 700 may change the seat selected by the audience to a reservation state and may transmit a payment window to the mobile device of the audience. The audience may perform a payment operation via the payment window. The mobile device may transmit information of the payment operation to the TV 700 in real time. The TV 700 may transmit a mobile ticket to the mobile device. According to the above process, the audience may select the seat and buy the ticket without standing in a line.

Figure 8:
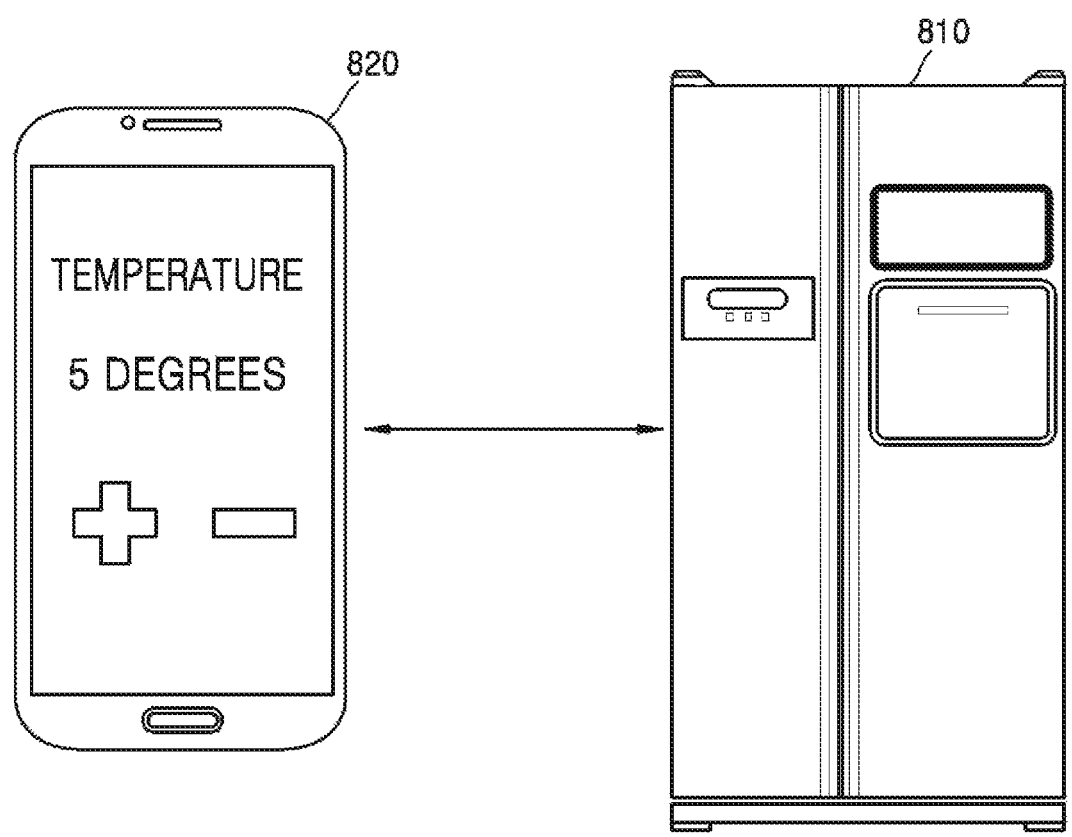
FIG. 8 is a diagram illustrating sharing an application for controlling things with a mobile device, according to an exemplary embodiment.

FIG. 8 is a diagram illustrating sharing an application for controlling things with a mobile device 820, according to an exemplary embodiment. Things may be controlled by mobile devices via Internet-of-things (IoT). For example, the things may be smart devices such as refrigerators, cleaners, TVs, boilers, etc., may be wirelessly connected to mobile devices, and may include a processor capable of processing data.

Although a smart device is to include a screen for receiving a user input, cost and power consumption due to the screen may be reduced by excluding the screen from a smart device. In other words, instead of including the screen in the smart device, the smart device may be controlled using a screen of a mobile device.

FIG. 8 illustrates a smart refrigerator 810 as an example of a smart device.

Firstly, a WLAN interface may be added to the smart refrigerator 810. The smart refrigerator 810 may execute an application (e.g., a temperature control application).

A user may open a WLAN via the mobile device 820, may select the smart refrigerator 810 that is operating from a WLAN list, and may establish a WLAN connection to the smart refrigerator 810.

After the WLAN connection is established, the smart refrigerator 810 may transmit a name list of applications to the mobile device 820. The mobile device 820 may display the name list of applications on the screen.

The user may select a name of an application, e.g., the temperature control application, via the screen of the mobile device 820. The selected name may be transmitted to the smart refrigerator 810. The smart refrigerator 810 may create a window instance of the temperature control application. Windows created after execution of the temperature control application may be sequentially included in the window instance. The windows may be transmitted to the mobile device 820 in real time.

The mobile device 820 may display the windows. For example, as shown in FIG. 8, the mobile device 820 may display a current temperature of 5 degrees and + and − buttons for increasing or reducing a temperature of the smart refrigerator 810. If the user presses the + button, the mobile device 820 may transmit data indicating an increased in the temperature to the smart refrigerator 810.

In another exemplary embodiment, a game application may be shared by devices of game players. The game application may operate by being installed in a source device such as a TV, a server, etc.

A device of a game player such as a mobile device may establish a WLAN connection with the source device via a WLAN interface.

After establishing the WLAN connection with the device of the game player, the source device may transmit a name list of game applications provided by the source device to the device of each game player. The device of each game player may display the name list of the game applications on a screen.

Each game player may select a game application name via a screen of the device of the game player. The selected game application name may be transmitted to the source device.

The source device may receive the game application name from the device and may create a window instance of a game application corresponding to the received game application name for the device of the game player. Windows created after execution of the game application may be sequentially included in the window instance. The windows may be transmitted to the device of the game player in real time.

For example, when a plurality of game players select the same game, e.g., a racetrack game, the source device may create a window instance of the racetrack game for the device of each game player. Operation information of each game player may be transmitted to the source device. The source device may determine contents that are to be displayed on the window of the game player according to the operation information of the game player. Devices of different game players may display different game perspectives and contents. At the same time, the source device may run a game server application to display a whole game perspective such as, a racing circuit. Because the game server application and client applications are both run on the source device, data interaction may be easy to perform without cross devices. In addition, rendering of game pictures may be finished on the source device, and the device of each game player may not need to install a game client and may not need to configure a strong graphics processor, so that less resources may be used for the device of each game player.

Figure 9:
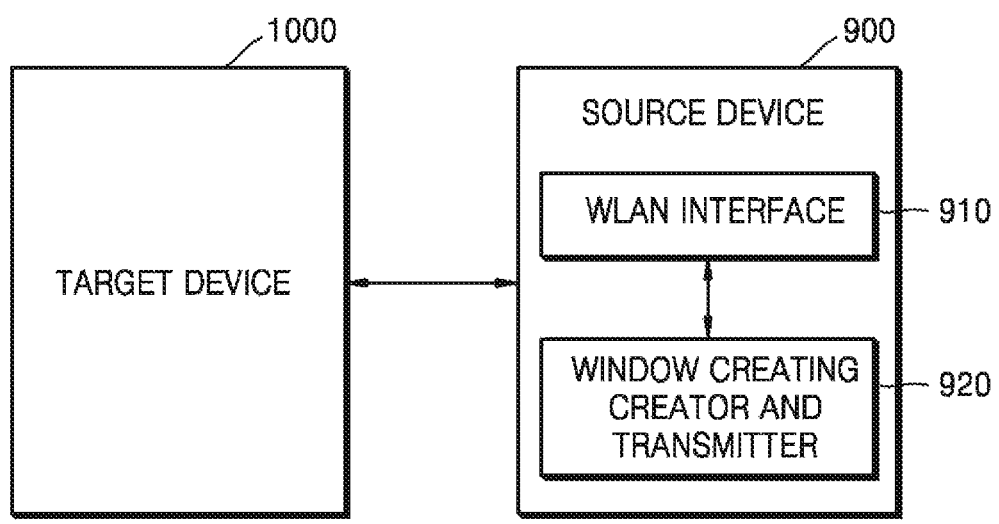
FIG. 9 is a block diagram of a source device, according to an exemplary embodiment.

FIG. 9 is a block diagram of a source device 900, according to an exemplary embodiment. The source device 900 includes a WLAN interface 910 and a window creator and transmitter 920.

The WLAN interface 910 may establish a WLAN connection with a target device 1000. A sharing application may be installed on the source device and may not be installed on the target device 1000.

After the WLAN connection is established, the window creator and transmitter 920 may receive a sharing application access request from the target device 1000, start the sharing application, create a window instance of the sharing application for the target device 1000, and transmit windows created during execution of the sharing application to the target device 1000.

The source device 900 may further include a sharing application name list transmitter to transmit a name list of shareable applications provided by the source device 900 to the target device 1000 after the WLAN connection is established.

The window creator and transmitter 920 may receive the sharing application access request carrying a sharing application name from the target device 1000. The window creator and transmitter 920, after receiving the sharing application access request from the target device 1000 and before starting the sharing application, may determine whether the sharing application is executing on the source device 900, may directly create a window instance of the sharing application for the target device 1000 if the sharing application is executing on the source device 900, and may start the sharing application if the sharing application is not executing on the source device 900.

The window creator and transmitter 920, after receiving the sharing application access request from the target device 1000 and before creating the window instance of the sharing application for the target device 1000, may determine whether the number of the target devices 1000 accessing the sharing application is less than an appropriate number of the target devices 1000 accessing the sharing application. If the number of the target devices 1000 accessing the sharing application is less than the maximum value of the target devices 1000 accessing the sharing application, the window creator and transmitter 920 may create the window instance of the sharing application for the target device 1000. If the number of the target devices 1000 accessing the sharing application is greater than or equal to the appropriate number of the target devices 1000 accessing the sharing application, the window creator and transmitter 920 may sequentially add target device identifiers to a waiting queue of the sharing application. When another target device 1000 quits the sharing application, the window creator and transmitter 920 may extract a first target device identifier from the waiting queue, and may create the window instance of the sharing application for the target device 1000 corresponding to the extracted target device identifier.

When transmitting the windows created during execution of the sharing application to the target device 1000, the window creator and transmitter 920 may search for a static window list in a buffer for a static window according to coding of the static window when the sharing application is to create the static window. If the static window is found, the window creator and transmitter 920 may directly copy the static window in the buffer and may transmit the copied static window to the target device 1000. If no static window is found, the window creator and transmitter 920 may create and copy a static window, may transmit the copied static window to the target device 1000, and may store the copied static window to the static window list in the buffer.

After transmitting the windows created during the execution of the sharing application to the target device 1000, the window creator and transmitter 920 may receive information input in the window of the sharing application from the target device 1000 and may process the information.

The source device 1000 may be located in a source device cluster. The WLAN interface 910 may receive a WLAN connection establishing notification carrying an identifier of the target device 1000 from a cluster manager of the source device cluster and may establish the WLAN connection with the target device 1000. The WLAN connection establishing notification may be an WLAN connection establishing notification carrying the identifier of the target devices 1000 transmitted to the WLAN interface 910 of the source device 900 after the cluster manager receives a WLAN connection request from the target device 1000 and selects the source device 900 from the source device cluster according to a preconfigured load-balancing algorithm.

Figure 10:
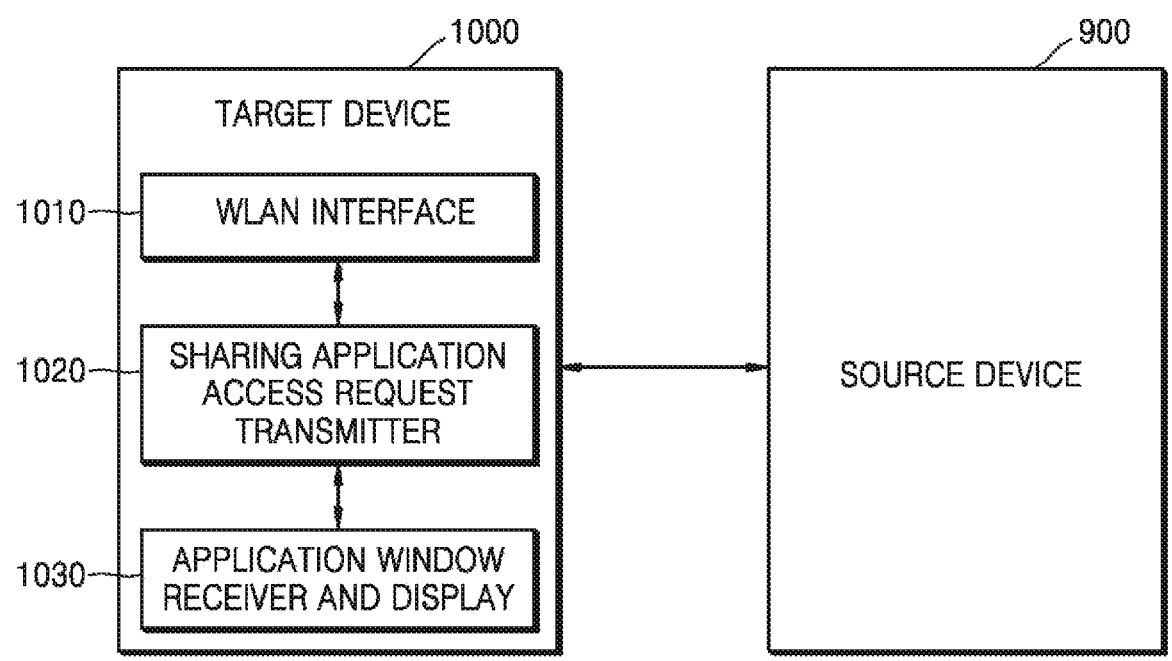
FIG. 10 is a block diagram of a target device, according to an exemplary embodiment.

FIG. 10 is a block diagram of the target device 1000, according to an exemplary embodiment. The target device 1000 includes a WLAN interface 1010, a sharing application access request transmitter 1020, and an application window receiver and display 1030.

The WLAN interface 1010 may establish a WLAN connection with the source device 900. A sharing application may be installed on the source device 900 and may not be installed on the target device 1000.

The sharing application access request transmitter 1020 may transmit a sharing application access request to the source device 900 when the sharing application is to be used.

The application window receiver and display 1030 may receive windows created during execution of the sharing application from the source device 900 and may display the windows on a screen.

The sharing application access request transmitter 1020 may receive a name list of shareable applications from the source device 900, and may transmit the sharing application access request carrying a sharing application name selected by a user to the source device 900 when detecting that the user selects the sharing application name from the name list of the shareable applications.

The target device 1000 may further include an information transmitter to transmit information to the source device 900 in real time when receiving the information input by the user in the window of the sharing application.

Figure 11:
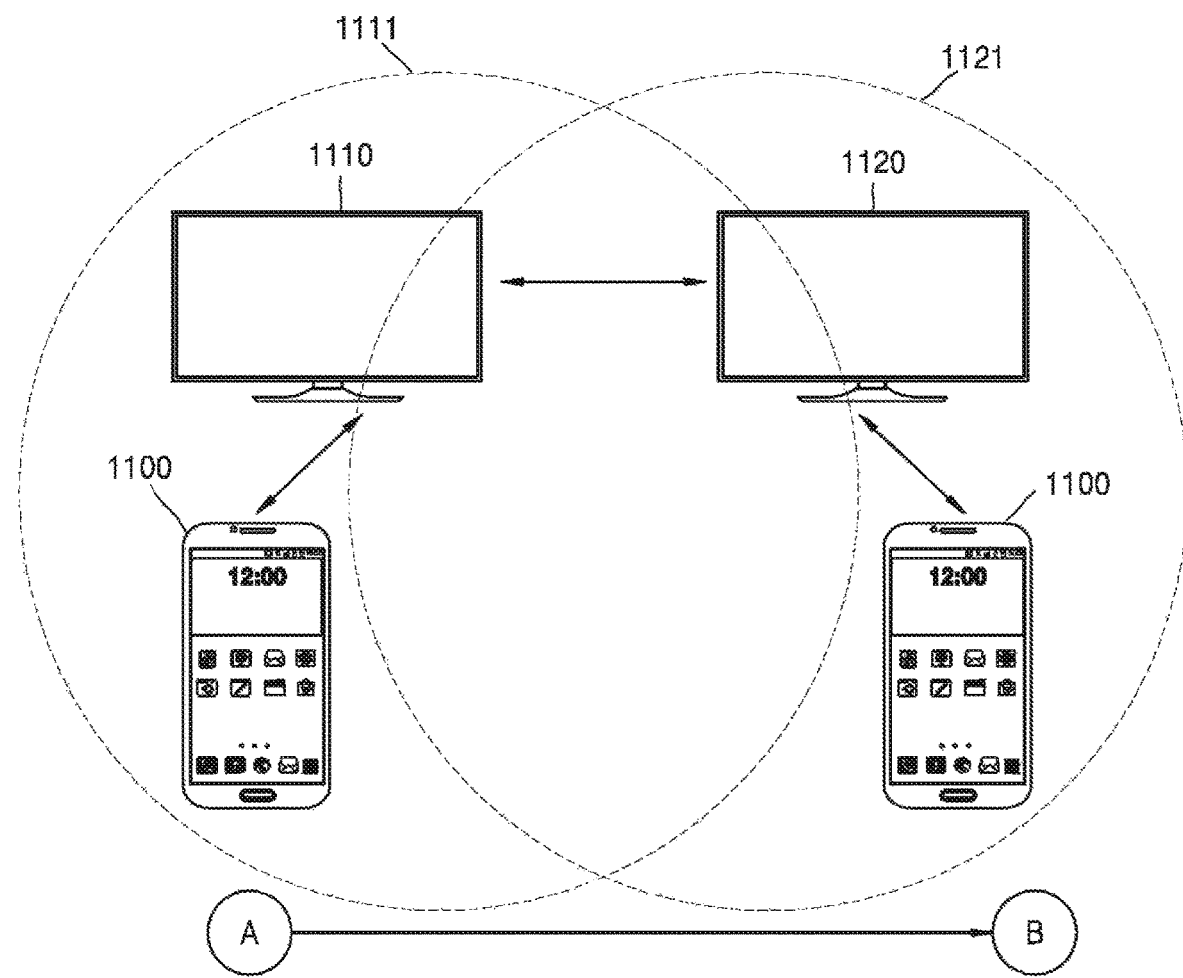
FIG. 11 is a diagram illustrating a method of sharing an application, according to an exemplary embodiment.

FIG. 11 is a diagram illustrating a method of sharing an application, according to an exemplary embodiment. Referring to FIG. 11, first and second source devices 1110 and 1120 may sequentially execute a sharing application according to a movement of a target device 1100. The first and second source devices 1110 and 1120 may continuously provide the sharing application to the target device 1100 even if the target device 1100 moves. For example, if a user of the target device 1110 moves to a different floor of a shopping mall while performing wireless communication with a TV in the shopping mall, wireless communication between the target device 1110 and the TV may end. In this regard, another TV located in the different floor may perform wireless communication with the target device 1110 and may provide the sharing application to the target device 1110.

A first region 1111 includes a communication available region of the first source device 1110. A second region 1121 includes a communication available region of the second source device 1120. The first source device 1110 and the second source device 1120 are located in a region in which communication therebetween is available and may transmit and receive data to and from each other. The first source device 1110 and the second source device 1120 may store and execute the same applications.

FIG. 11 illustrates a case in which the target device 1100 moves from a location A to a location B. When the target device 1100 moves from the location A to the location B, the target device 1100 leaves the first region 1111 and ends a communication connection with the first source device 1110. Thus, the second source device 1120 may start the sharing application for the target device 1100 and may continuously provide a window, an image, a moving image to the target device 1100.

The second source device 1120 may determine whether the target device 1100 is located in the second region 1121. The second source device 1120 may determine whether the target device 1100 has left the first region 1111. If the target device 1100 is located in the first region 1111 although the target device 1100 moves, the target device 1100 may maintain a wireless connection with the first source device 1110. Thus, when the target device 1100 is not included in the first region 1111 and is included in the second region 1121, the second source device 1120 and the target device 1100 establish the wireless connection.

The second device 1120 may receive data indicating whether the target device 1100 leaves the first region 1111 from the first source device 1110. If the target device 1100 leaves the first region 1111 while providing the sharing application to the target device 1000, the first source device 1110 may transmit data to peripheral source devices (e.g., the second source device 1120). The data may indicate that connection between the first source device 1110 and the target device 1100 ends.

The second source device 1120 may receive information of the sharing application that is executing in the first source device 1110 and execution information of the sharing application. The information of the sharing application may include an identifier, a name, a download path, etc. of the sharing application. The execution information of the sharing application may include the window, the image, or the moving image, etc. that are provided to the target device 1100 after the first source device 1100 executes the sharing application and may include a reproduction location of the moving image. The reproduction location of the moving image may indicate a location, time, etc. of the moving image that is being reproduced when the wireless connection between the first source device 1110 and the target device 1100 ends.

The second source device 1120 may execute the sharing application that is executing in the first source device 1110 and may transmit an execution result of the sharing application to the target device 1100. In this regard, the second source device 1120 may transmit the execution result of the sharing application to the target device 1100 based on the received execution information of the sharing application. Thus, the target device 1100 may seamlessly provide the execution result of the sharing application to the user.

Although an example in which the first source device 1110 and the second source device 1120 may communicate with each other is described in FIG. 11, the second source device 1120 may execute the sharing application when the first source device 1110 and the second source device 1120 do not communicate with each other. The target device 1100 may transmit information of the sharing application executed in the first source device 1110 to the second source device 1120. The second source device 1120 may execute the sharing application according to the information of the sharing application received from the target device 1100.

Referring again to FIGS. 9 and 10, the target device 1000 may not need to install the sharing application and may remotely use the sharing application on the source device 900, and thus resources and network traffic of the target device 1000 may be saved.

The target device 1000 and the source device 900 may use different operating systems. Any smart device may be taken as the source device 900, and one or more applications installed on the smart device may be shared with another smart device.

Updating and upgrading may be performed only for applications on the source device 900. It may be unnecessary to release an upgraded version on the Internet or an application store. For developers of the application, development and debugging may be performed for an operating system platform of the source device 900 only, rather than performed for different platforms. Thus, maintenance may be flexible, and development cost may be saved.

Finally, while an application is executing, information interaction may be performed between the source device 900 and the target device 1000 based on a WLAN connection, and thus the information interaction may be within a local network rather than the public Internet. For some information, such as account information, bank card information, etc., security of the information interaction may be improved.

As described above, according to the one or more of the above exemplary embodiments, a target device may use an application without having to install the application.

A plurality of target devices may share the same application.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of sharing an application, the method being performed by a source device, and the method comprising:

determining, by the source device, whether a target device is located in a communication range of the source device;

based on the target device being determined to be located in the communication range of the source device, establishing, by the source device, a wireless connection to the target device;

transmitting, by the source device, to the target device to which the wireless connection is established, a list of shareable applications executable by the source device, each of the shareable applications being executable to generate one or more window instances;

receiving, by the source device, from the target device, a request to access the application in the list of the shareable applications that is transmitted;

based on the request to access the application being received, executing, by the source device, the application, generating, by the source device, a window instance of the application, for the target device, wherein the window instance includes at least one window that is generated after the application is executed, and transmitting, by the source device, to the target device, the at least one window generated to be displayed and to receive an input of a user, at the target device;

determining, by the source device, whether the target device to which the at least one window is transmitted leaves the communication range of the source device;

based on the target device being determined to leave the communication range of the source device, searching, by the source device, for another source device able to communicate with the target device; and based on the other source device being found, transmitting, by the source device, to the other source device, first information of the application that is executed in the source device, along with execution information of the application that is executed in the source device, enabling the other source device to continuously execute the application based on the first information and the execution information, wherein the first information of the application comprises an identifier of the application, and the execution information comprises the at least one window that is generated and at least one of an image or a moving image that is provided to the target device after the application is executed.

2. The method of claim 1, wherein the receiving comprises receiving, from the target device, the name of the application that is selected by the user from the list of the shareable applications that is transmitted.

3. The method of claim 1, further comprising, based on the request to access the application being received, determining whether the application is executed on the source device, wherein the generating comprises, based on the application being determined to be executed on the source device, generating the window instance of the application that is executed, for the target device, and the executing comprises, based on the application being determined to not be executed on the source device, executing the application.

4. The method of claim 1, further comprising, based on the target device being determined to leave the communication range of the source device, ending the wireless connection to the target device.

5. The method of claim 1, further comprising:

determining whether the target device is attempting to access the application for more than an access time; and ending the wireless connection to the target device, based on the target device being determined to attempt to access the application for more than the access time.

6. The method of claim 1, further comprising:

determining whether the target device does not perform an operation of the application that is executed, for more than an operation standby time; and ending the wireless connection to the target device, based on the target device being determined to not perform the operation of the application that is executed, for more than the operation standby time.

7. The method of claim 1, wherein the source device is located in a source device cluster, a cluster manager of the source device cluster receives a wireless connection request from the target device, and based on the wireless connection request being received, selects the source device from the source device cluster, based on a load-balancing algorithm, and the method further comprises receiving, from the cluster manager, a notification to establish the wireless connection to the target device.

8. An apparatus for sharing an application, the apparatus being a source device, and the apparatus comprising:

a processor configured to determine whether a target device is located in a communication range of the source device; and a communicator configured to, based on the target device being determined to be located in the communication range of the source device, establish a wireless connection to the target device, wherein the processor is further configured to:

control the communicator to transmit, to the target device to which the wireless connection is established, a list of shareable applications executable by the source device, each of the shareable applications being executable to generate one or more window instances;

receive, from the target device via the communicator, a request to access the application among the list of the shareable applications that is transmitted;

based on to the request to access the application being received, execute the application, generate a window instance of the application, for the target device, wherein the window instance includes at least one window that is generated after the application is executed, and control the communicator to transmit, to the target device, the at least one window generated to be displayed and to receive an input of a user, at the target device;

determine whether the target device to which the at least one window is transmitted leaves the communication range of the source device;

based on the target device being determined to leave the communication range of the source device, search for another source device able to communicate with the target device; and based on the other source device being found, transmit, by the source device, to the other source device, first information of the application that is executed in the source device, along with execution information of the application that is executed in the source device, enabling the other source device to continuously execute the application based on the first information and the execution information, wherein the first information of the application comprises an identifier of the application, and the execution information comprises the at least one window that is generated and at least one of an image or a moving image that is provided to the target device after the application is executed.

9. The apparatus of claim 8, wherein the processor is further configured to receive, from the target device via the communicator, the name of the application that is selected by the user from the list of the shareable applications that is transmitted.

10. The apparatus of claim 8, wherein the processor is further configured to:

based on the request to access the application being received, determine whether the application is executed on the source device;

based on the application being determined to be executed on the source device, generate the window instance of the application that is executed, for the target device; and based on the application being determined to not be executed on the source device, execute the application.

11. The apparatus of claim 8, wherein the processor is further configured to, based on the target device being determined to leave the communication range of the source device, end the wireless connection to the target device.

12. The apparatus of claim 8, wherein the processor is further configured to:
   determine whether the target device is attempting to access the application for more than an access time; and
   end the wireless connection to the target device, based on the target device being determined to attempt to access the application for more than the access time.

13. The apparatus of claim 8, wherein the processor is further configured to:
   determine whether the target device does not perform an operation of the application that is executed, for more than an operation standby time; and
   end the wireless connection to the target device, based on the target device being determined to not perform the operation of the application that is executed, for more than the operation standby time.

14. The apparatus of claim 8, wherein the processor is further configured to:
   receive, from the target device via the communicator, second information that is input to the window instance that is transmitted and displayed on the target device; and
   process the second information that is received.

15. The apparatus of claim 8, wherein the source device is located in a source device cluster,
   a cluster manager of the source device cluster receives a wireless connection request from the target device, and based on the wireless connection request being received, selects the source device from the source device cluster, based on a load-balancing algorithm, and
   the communicator is further configured to receive, from the cluster manager, a notification to establish the wireless connection to the target device.

\* \* \* \* \*